(12) United States Patent
Lakshminarayanan et al.

(10) Patent No.: US 8,863,152 B2
(45) Date of Patent: Oct. 14, 2014

(54) COMMUNICATION BRIDGE

(75) Inventors: Sudhindra Kumar Thokur Lakshminarayanan, Bangalore (IN); Kavita Chidanand Masur, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 880 days.

(21) Appl. No.: 12/708,542

(22) Filed: Feb. 19, 2010

(65) Prior Publication Data

US 2011/0010724 A1    Jan. 13, 2011

(30) Foreign Application Priority Data

Jul. 13, 2009  (IN) .......................... 1653/CHE/2009

(51) Int. Cl.
*G06F 9/46*    (2006.01)
*G06F 9/54*    (2006.01)

(52) U.S. Cl.
CPC ..................................... *G06F 9/541* (2013.01)
USPC ........................................ 719/315; 719/313

(58) Field of Classification Search
CPC ...................................................... G06F 9/541
USPC ........................................... 719/313, 315, 316
See application file for complete search history.

(56) References Cited

U.S. PATENT DOCUMENTS

| | | | |
|---|---|---|---|
| 6,308,178 B1 * | 10/2001 | Chang et al. | 1/1 |
| 6,839,896 B2 * | 1/2005 | Coffman et al. | 719/310 |
| 6,842,906 B1 * | 1/2005 | Bowman-Amuah | 719/330 |
| 7,150,001 B1 * | 12/2006 | Pepin et al. | 717/107 |
| 7,219,351 B2 * | 5/2007 | Bussler et al. | 719/313 |
| 7,225,425 B2 * | 5/2007 | Kompalli et al. | 717/108 |
| 7,275,087 B2 * | 9/2007 | Vaschillo et al. | 709/218 |
| 7,383,355 B1 * | 6/2008 | Berkman et al. | 709/246 |
| 7,802,230 B1 * | 9/2010 | Mendicino et al. | 717/113 |
| 2004/0002944 A1 * | 1/2004 | Hauser et al. | 707/1 |
| 2005/0010931 A1 * | 1/2005 | Langkafel et al. | 719/328 |

* cited by examiner

*Primary Examiner* — Emerson Puente
*Assistant Examiner* — Willy W Huaracha
(74) *Attorney, Agent, or Firm* — Sumit Dhingra (57) ABSTRACT

Presented is a method and system for providing a communication bridge between two computer technologies. The method includes defining interfaces for the two computer technologies, wherein each interface includes certain parameters, generating classes that contain methods in the two computer technologies, based on the parameters included in the interfaces, publishing the interfaces for invocation of methods between the two computer technologies.

15 Claims, 6 Drawing Sheets

```
- <BridgeDefinition>
    <source technology="APPLET" />
  - <target technology="FLEX" objid="swfID_0">
      <methodname>showRealTimeABC</methodname>
      <className>TestViewMx</className>
    </target>
  - <parameters>
      <parameter type="String" name="nodeName" />
      <parameter type="String" name="categoryName" />
    </parameters>
  </BridgeDefinition>
```

FIG. 3

```
- <BridgeDefinition>
    <source technology="FLEX" />
  - <target technology="GWT">
      <methodname>showHistoricalGraph</methodname>
      <className>com.hp.pm.Controller</className>
    </target>
  - <parameters>
      <parameter type="String" name="nodeName" />
      <parameter type="int" name="categoryType" />
    </parameters>
  </BridgeDefinition>
```

COMMUNICATION BRIDGE

RELATED APPLICATIONS

Benefit is claimed under 35 U.S.C. 119(a)-(d) to Foreign application Serial No. 1653/CHE/2009 entitled "Communication Bridge" by Hewlett-Packard Development Company, L.P., filed on Jul. 13, 2009, which is herein incorporated in its entirety by reference for all purposes.

BACKGROUND

Rich Internet Applications (RIAs) are web based applications that function as desktop applications, albeit with some differences. RIAs typically form a client application with a separate services layer on the backend. They provide rich user experience and enhance data performance as the server communication is limited to a great extent. Many modern interface development technologies have been labeled as Rich Internet Application Technologies. These include AJAX, Adobe Flex, Adobe Flash Player, AIR, JavaFX, Google Web Toolkit (GWT) etc.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

There are many technology options available to a developer when it comes to developing a web based application that provides a rich user experience. Popularly referred as Rich Internet Applications (RIAs), some of these computer technologies are AJAX (Asynchronous JavaScript and XML), Adobe Flex, Google Web Toolkit (GWT) and Java Applets. The availability of multiple technology options has led to different applications getting developed with different technologies. However, to provide business value to customers, these applications have to interact seamlessly with each other. This provides a technical challenge as sharing or exchanging information across the various technologies is not easy. Additionally, this also brings in a need for application developers to learn multiple technologies to implement the integration among various applications.

One way to overcome the above problem is for a technology to make round-trips to the server, but this is against the principles of Rich Internet Applications. Also, RIAs usually have most of the data cached in the client side to provide desktop-like interactivity. This requires sharing or exchange of information between applications on the client side itself. But making method calls and passing contextual information across different applications in the client side browser environment is complex due to technology differences. The developers need to learn other technologies to effectively consume interfaces exposed by other applications. They have to invest time and effort in learning the internals of different technologies, resulting in non-optimized code for the interfaces. There is no single common bridge that can act as a data conduit between the different RIA technologies in the client side itself.

Proposed is a solution for providing a communication bridge between two different computer technologies, especially, RIA technologies like GWT, Flex, Applets, AJAX etc., on the client-side, without having to make server-side round trips. This approach requires minimal implementation and maintenance efforts from developers. The proposed method provides a generic declarative way of defining the interfaces and generates standard interfaces to bridge the technologies.

For clarity and convenience, following definitions are used herein:

The term computer technology refers to the activity of designing and constructing and programming computers. (Source WordNet, Princeton University©)

The term Rich Internet Application (RIA) refers to a Web application that has been arranged to deliver functionality and features that have most of the characteristics of a desktop application.

The term Rich Internet Application (RIA) technology refers to computer technologies that may be used to create Rich Internet Applications (RIAs).

Figure 1:
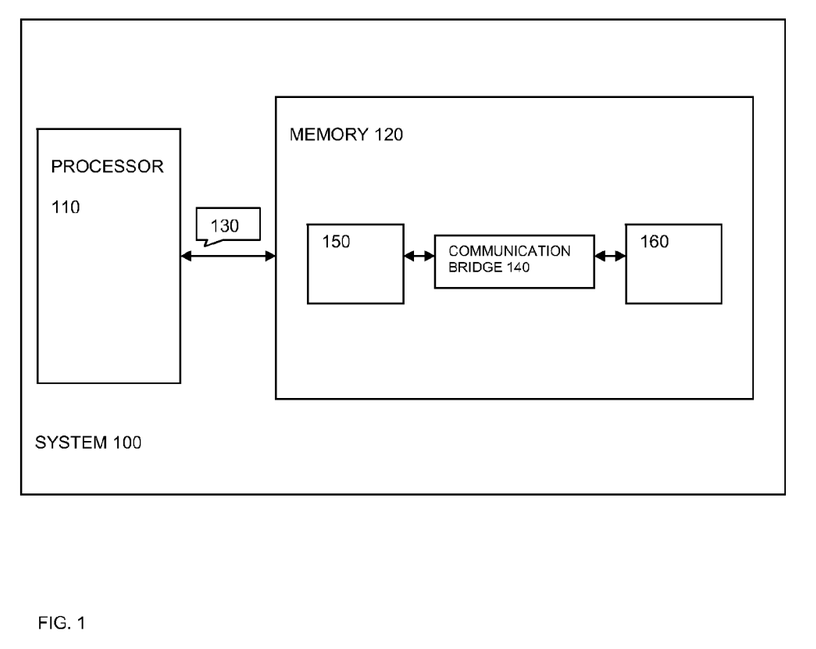
FIG. 1 shows a system for implementing a communication bridge between two computer technologies according to an embodiment.

FIG. 1 shows a system 100 for implementing a communication bridge between two computer technologies according to an embodiment.

The system 100 may be any kind of electronic device, such as, but not limited to, a personal computer, a desktop computer, a laptop computer, a notebook computer, a network computer, a personal digital assistant (PDA), a mobile device, a hand-held device, or any other suitable electronic device. Further, the system 100 may be a standalone system or a network system connected to other electronic devices through wired or wireless means.

The system 100 may include a processor 110 and a memory 120. These components may be coupled together through a system bus 130. The memory 120 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc.

The system 100 may include, in memory 120, a communication bridge 140 and one or more computer technologies 150, 160. The computer technologies may include RIA technologies, such as, but not limited to, AJAX (Asynchronous JavaScript and XML), Adobe Flex, Google Web Toolkit (GWT) and Java Applets. The system may also include computer applications developed using RIA technologies.

It would be appreciated that the system components depicted in FIG. 1 are for the purpose of illustration only and the actual components may vary depending on the computing device deployed for implementation of the present invention.

Figure 2:
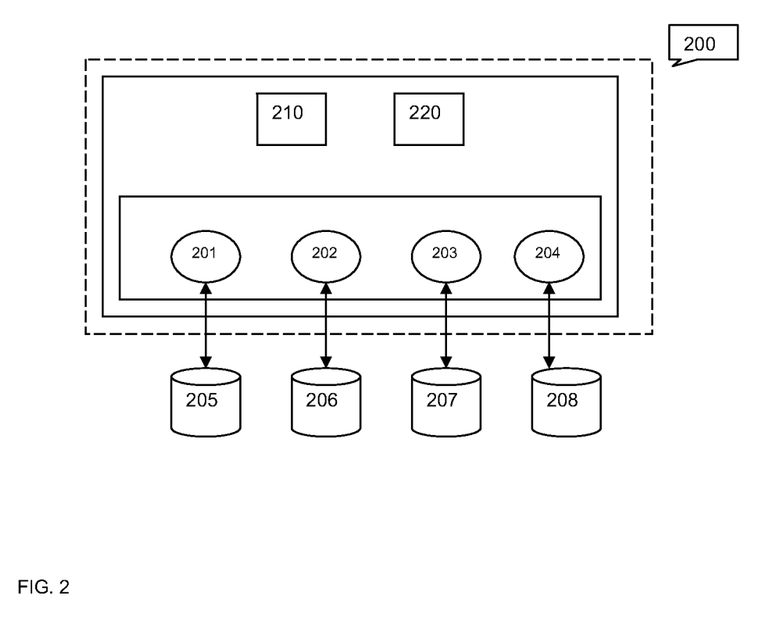
FIG. 2 shows a graphic representation of a communication bridge according to an embodiment.

FIG. 2 shows a graphic representation of a communication bridge 200 according to an embodiment.

The communication bridge 200 acts as an interface between two or more computer technologies. It allows two computer technologies (such as, Rich Internet Application (RIAs) technologies) to communicate with each other. For example, it may allow a Google Web Toolkit (GWT) application to communicate with an Adobe Flex application, a Java applet application to communicate with an AJAX application, an Adobe Flex application to communicate with an AJAX application, etc. It would be appreciated that these examples are for the purpose of illustration only and any two or more computer technologies may communicate with each other using the communication bridge 200.

In an embodiment, the communication bridge 200 includes a one or more interface 210 for two or more computer technologies, a bridge creator module 220 and one or more bridge modules (201, 202, 203, and 204).

Figure 3:
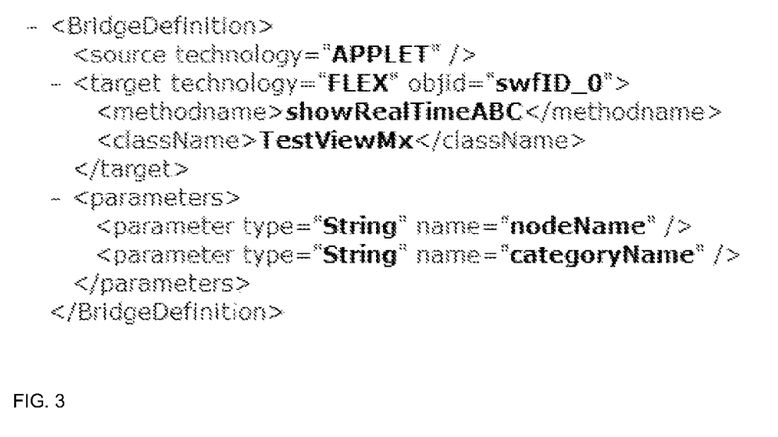
FIG. 3 shows a part of a sample XML file providing Bridge Definition for an interface between a Java Applet and an Adobe Flex according to an embodiment.
Figure 4:
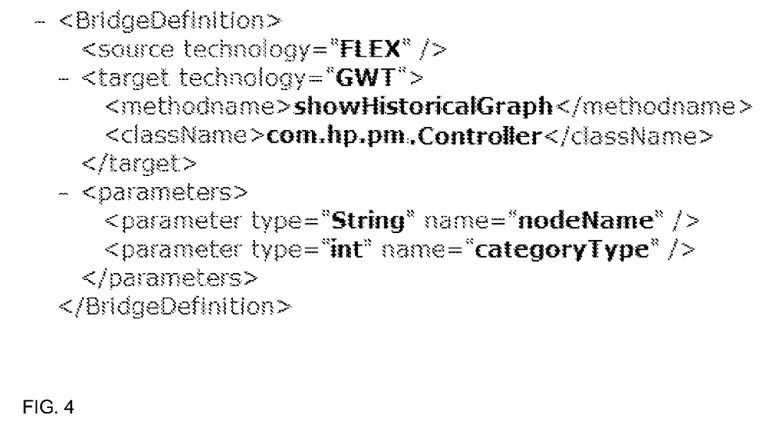
FIG. 4 shows a part of a sample XML file providing Bridge Definition for an interface between an Adobe Flex and a Google Web Toolkit (GWT) according to an embodiment.

The interface 210 for two or more computer technologies (such as, RIAs) may be defined in a declarative way using the communication bridge 200. The interfaces may be defined in an XML file, which may conform to XML Schema Definition (XCD) provided by the communication bridge 200. Each interface may be defined using a BridgeDefinition, which has attributes such as Source Technology, Target Technology, Object ID, Target Class, Method Name, Input parameters and their types, Return Value and its type. A single XML file may be used to specify the interfaces required for all the technologies. A part of a sample XML file is shown in FIG. 3 and FIG. 4.

The bridge creator module 220 parses the XML file defined earlier. The module 220 may be a batch file for Windows or a shell script for UNIX. It generates the required classes which contain the methods in the specified computer technologies based on the parameter definitions.

The communication bridge 200 generates individual bridge modules based on the interface definitions.

FIG. 2 illustrates the generation of individual bridge modules (201, 202, 203, and 204) for Google Web Toolkit (GWT) application 205, Adobe Flex application 206, a Java applet application 207 and an AJAX application 208, respectively. The bridge modules (GWT bridge 201, Flex bridge 202, Applet bridge 203 and AJAX bridge 204) invoke interfaces exposed by other technologies and publish interfaces for others to invoke. These modules may use native JavaScript and a browser's Document Object Model (DOM) object to communicate with each other. For example, the GWT bridge 201 module may use JSNI (JavaScript Native Interface) to invoke native JavaScript methods from within a GWT application 205 and vice versa. The communication bridge 200 generates these native JavaScript methods, which get a reference to the target object (e.g., SWF—Shock Wave Flash object or Applet) from the browser's DOM object using target object's 'objectid' to make the method calls. To provide another example, the Flex bridge module 202 may publish the interfaces exposed by the Flex application 206. It uses Flex's ExternalInterface class for publishing the methods to JavaScript, by setting up a callback for the Flash object in HTML. JavaScript may then use these callback methods to invoke functions in ActionScript. In another example, the Applet bridge may use the 'JSObject' class for interacting with JavaScript.

FIG. 3 shows a part of a sample XML file providing Bridge Definition for an interface between a Java Applet and an Adobe Flex according to an embodiment. As mentioned earlier, each interface is defined using a BridgeDefinition, which has various attributes such as Source Technology, Target Technology, Object ID, Input parameters and their types, etc. In the present embodiment, the source technology is a Java Applet, and the target technology is Adobe Flex.

FIG. 4 shows a part of a sample XML file providing Bridge Definition for an interface between an Adobe Flex and a Google Web Toolkit (GWT) according to an embodiment. In the present embodiment, the source technology is Adobe Flex, and the target technology is GWT.

The communication bridge takes care of type casting the various parameters based on the data types in each of the specified RIA technologies. The bridge creator module creates appropriate files to be consumed by RIA technologies. For example, for GWT based interface definitions, a 'jar' (Java Archive) file may be generated containing class files with the required methods. These methods may be directly called in RIA applications. For Flex based interface definitions, an 'swc' file may be generated, which may include the Flex action script methods to be used by the Flex application. For Applet based definitions, a 'jar' file may be generated. For AJAX based applications, a 'js' (JavaScript) file may be generated, which may be embedded as part of the AJAX application.

Figure 5:
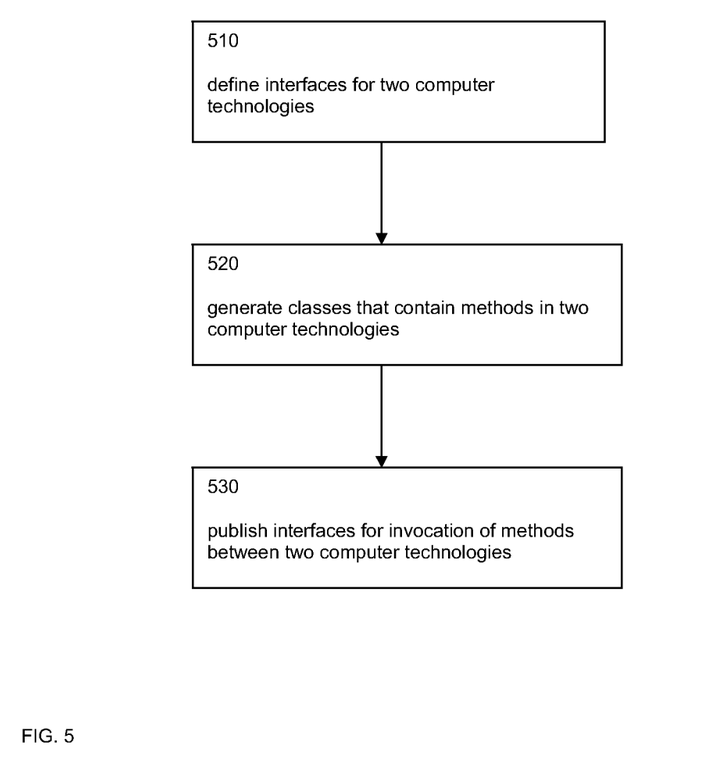
FIG. 5 shows a flow chart of a method for establishing a communication bridge between two computer technologies according to an embodiment.

FIG. 5 shows a flow chart of a computer-implemented method of providing a communication bridge between two computer technologies according to an embodiment.

Step 510 includes defining interfaces for two or more computer technologies (such as, RIA). Each interface may include certain parameters. The interface for two or more computer technologies may be defined in a declarative way using a communication bridge. This has been described earlier in detail w.r.t. FIG. 2.

Step 520 includes generating classes that contain methods in the two computer technologies based on the parameters included in the interfaces. This step has again been described earlier in detail w.r.t. FIG. 2.

Step 530 includes publishing the interfaces for invocation of methods between the two computer technologies. The communication bridge generates individual bridge modules based on the parameter definitions. This has been illustrated in FIG. 2.

Figure 6:
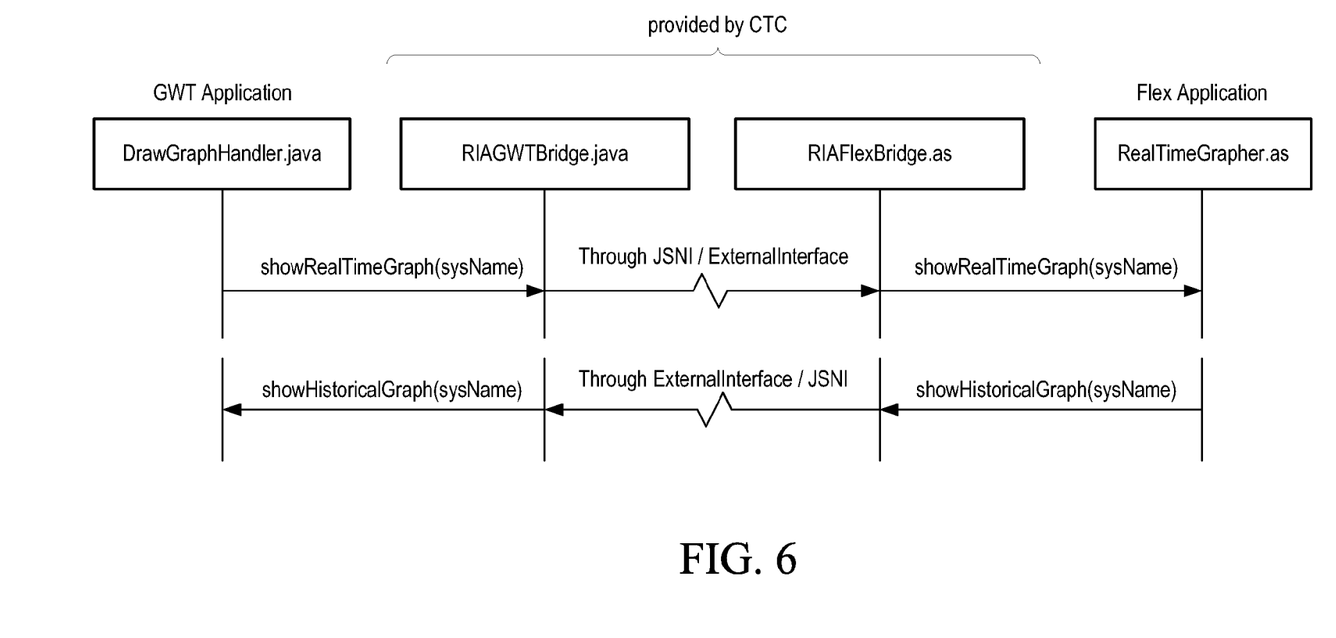
FIG. 6 shows a sample control flow between a Google Web Toolkit (GWT) and an Adobe Flex through a communication bridge according to an embodiment.

FIG. 6 shows a sample control flow between a first computer technology (Google Web Toolkit (GWT)) and a second computer technology (Adobe Flex) through a communication bridge according to an embodiment.

The control flow between two computer technologies includes placing of a call request by the first computer technology, at an interface provided by the communication bridge in the first computer technology itself. Then the call request is made for invoking an interface provided by the communication bridge in the second computer technology. This in turn invokes the target method in the second computer technology.

In the present embodiment, a GWT application may need to call a Flex application. The GWT class "DrawGraphHandler.java" may invoke a method in the Flex ActionScript RealTimeGrapher.as to launch a real time graph for a given system. The GWT class calls the interface provided by RIAGWTBridge.java (part of the GWT Bridge module), which invokes the method exposed by RIAFlexBridge.as (part of Flex Bridge module). This method in turn calls the required method in the specified ActionScript. The same control flow is reversed when the ActionScript needs to invoke a method in the GWT class. Similar control flows may be used for calls from a Flex application to an Applet application, from an Applet application to an AJAX application, etc.

The embodiments described above provide integration between different computer applications (such as, RIA applications) abstracting the technology differences. The proposed solution does not require a developer to write any code for the cross-technology method invocations, thus avoiding the learning-curve for other technologies. It provides a faster and low-maintenance integration between client-side technologies due to automatic code generation. It also improves performance by avoiding server side round trips for inter-technology communication.

It will be appreciated that the embodiments within the scope of the present invention may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present invention may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present invention is for the purpose of illustration only. Although the invention has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present invention.

The invention claimed is:

1. A computer-implemented method of providing a communication bridge between two computer technologies, the method comprising:
  receiving interface definitions for the two computer technologies, wherein each interface definition includes parameters and attributes including source technology, target technology, object ID of the target technology, target class of the target technology, and method name of a method in the target technology;
  for each interface definition, generating the target class of the interface definition that identifies the method named in the interface definition;
  for each interface definition, generating an interface from the interface definition, wherein each interface includes the generated target class of the interface definition; and
  publishing the interfaces for invocation of the methods between the two computer technologies.

2. The computer-implemented method according to claim 1, further comprising:
  receiving, at a first interface of the interfaces provided by the communication bridge in a first computer technology of the two computer technologies, a call request from an application in the first computer technology; and
  the first interface invoking a second interface of the interfaces provided by the communication bridge in a second computer technology computer technologies, in response to the call request received at the first interface, wherein
    the invoking of the second interface includes the first interface calling the second interface to invoke the target method of the second interface in the second computer technology or
  the invoking of the second interface includes the target class in the first interface calling an intermediary interface and the intermediary interface calling the second interface to invoke the target method of the second interface.

3. The computer-implemented method according to claim 1, wherein the two computer technologies are Rich Internet Application technologies.

4. The computer-implemented method according to claim 3, wherein the Rich Internet Application technologies include Asynchronous JavaScript and XML (AJAX), Adobe Flex, Google Web Toolkit (GWT) and Java Applets.

5. The computer-implemented method according to claim 1, wherein the interface definitions for the two computer technologies are defined in an XML file.

6. The computer-implemented method according to claim 5, wherein a single XML file is used to define the interface definitions required for the two computer technologies.

7. The computer-implemented method according to claim 5, wherein the XML file is parsed prior to generating the classes that contain the methods in a form specified in the two computer technologies.

8. The computer-implemented method according to claim 1, wherein the classes use native JavaScript to communicate with each other.

9. The computer-implemented method according to claim 1, wherein the interface definitions are defined using a Bridge Definition.

10. The computer-implemented method according to claim 1, wherein interface definition includes parameter types for the parameters, and a return value and its type.

11. The computer-implemented method according to claim 1, wherein the communication bridge is a component of a client system.

12. A system for providing a communication bridge between two computer technologies, the system comprising:
  a processor; and
  a memory comprising program instructions, wherein the program instructions are executable by the processor to:
  receive interface definitions for the two computer technologies, wherein the interface definitions include parameters and attributes including source technology, target technology, object ID of the target technology, target class of the target technology, and method name of a method in the target technology;
  for each interface definition, generate the target class of the interface definition that identifies the method named in the interface definition;
  for each interface definition, generate an interface from the interface definition, wherein each interface includes the generated target class of the interface definition; and
  publish the interfaces for invocation of the methods between the two computer technologies.

13. A computer program including machine readable instructions stored on a non-transitory computer readable medium, the computer program executable by a processor to:
  receive interface definitions for two computer technologies, wherein each interface definitions include parameters and attributes including source technology, target technology, object ID of the target technology, target class of the target technology, and method name of a method in the target technology;
  for each interface definition, generate the target class of the interface definition that that identifies the method named in the interface definition;
  for each interface definition, generate an interface from the interface definition, wherein each interface includes the target class of the interface definition; and publish the interfaces for invocation of the methods between the two computer technologies.

14. The computer program according to claim 13, wherein the computer program is executable by the processor to:
receive, at a first interface of the interfaces provided by the communication bridge in a first computer technology of the two computer technologies, a call request from an application in the first computer technology;
invoke a second interface of the interfaces for a second computer technology of the two computer technologies, in response to the call request received at the first interface, wherein
the invoking of the second interface includes the first interface calling the second interface to invoke the target method of the second interface in the second computer technology, or
the invoking of the second interface includes the target class in the first interface calling an intermediary interface and the intermediary interface calling the second interface to invoke the target method of the second interface.

15. The system of claim 12, wherein the processor is to:
receive, at a first interface of the interfaces provided by the communication bridge in a first computer technology of the two computer technologies, a call request from an application in the first computer technology;
invoke a second interface of the interfaces provided by the communication bridge in a second computer technology computer technologies, in response to the call request received at the first interface, wherein
the invoking of the second interface includes the first interface calling the second interface to invoke the target method of the second interface in the second computer technology, or
the invoking of the second interface includes the target class in the first interface calling an intermediary interface and the intermediary interface calling the second interface to invoke the target method of the second interface.

* * * * *

UNITED STATES PATENT AND TRADEMARK OFFICE
CERTIFICATE OF CORRECTION

| | |
|---|---|
| PATENT NO. | : 8,863,152 B2 |
| APPLICATION NO. | : 12/708542 |
| DATED | : October 14, 2014 |
| INVENTOR(S) | : Sudhindra Kumar Thokur Lakshminarayanan et al. |

Page 1 of 1

It is certified that error appears in the above-identified patent and that said Letters Patent is hereby corrected as shown below:

In the Claims:

In column 5, line 59, in Claim 2, after "technology" insert -- of the two --.

In column 6, line 63, in Claim 13, delete "that that" and insert -- that --, therefor.

In column 8, line 7, in Claim 15, after "technology" insert -- of the two --.

Signed and Sealed this
Seventeenth Day of March, 2015

Michelle K. Lee
*Director of the United States Patent and Trademark Office*